United States Patent
Cerrato et al.

(10) Patent No.: US 9,035,583 B2
(45) Date of Patent: May 19, 2015

(54) SYSTEM FOR CONTROLLING THE SPEED OF AN ELECTRIC FAN

(75) Inventors: Davide Cerrato, Asti (IT); Pierfranco Pangella, Buttigliera d'Asti (IT)

(73) Assignee: GATE S.R.L., Turin (IT)

( * ) Notice: Subject to any disclaimer, the term of this patent is extended or adjusted under 35 U.S.C. 154(b) by 312 days.

(21) Appl. No.: 13/324,183

(22) Filed: Dec. 13, 2011

(65) Prior Publication Data
US 2012/0153880 A1 Jun. 21, 2012

(30) Foreign Application Priority Data
Dec. 16, 2010 (IT) ............................... TO2010A1007

(51) Int. Cl.
H02P 3/00 (2006.01)
H02P 7/285 (2006.01)
H02P 3/14 (2006.01)

(52) U.S. Cl.
CPC . *H02P 7/285* (2013.01); *H02P 3/14* (2013.01)

(58) Field of Classification Search
CPC ...... F04D 27/004; F24F 11/0079; H02P 7/29; H02P 1/18; H02P 6/22; H02P 3/14; H02P 6/002; H02P 7/285; H05K 7/20209; Y02B 30/746
USPC ............ 318/400.06, 268, 269, 272, 273, 430, 318/471, 369, 376, 400.04, 400.09, 600, 318/601; 180/65, 265; 165/41, 44; 323/274, 323/284; 363/50; 361/679.48, 688, 23, 28, 361/30, 31
See application file for complete search history.

(56) References Cited

U.S. PATENT DOCUMENTS

| | | | | |
|---|---|---|---|---|
| 4,459,519 A * | 7/1984 | Erdman | ................... | 318/400.08 |
| 4,797,600 A * | 1/1989 | Savage et al. | ............ | 318/400.08 |
| 5,343,970 A * | 9/1994 | Severinsky | ............... | 180/65.25 |
| 6,125,798 A * | 10/2000 | Kuwayama et al. | ....... | 123/41.12 |
| 7,122,979 B2 * | 10/2006 | Wilton et al. | ............ | 318/400.09 |
| 7,621,142 B2 * | 11/2009 | Hoshi et al. | ..................... | 62/244 |
| 7,677,050 B2 * | 3/2010 | Sakaguchi et al. | ............. | 62/183 |
| 8,104,435 B2 * | 1/2012 | Schwartz et al. | .......... | 123/41.12 |
| 8,384,325 B2 * | 2/2013 | Mishima | .................. | 318/400.09 |
| 8,418,789 B2 * | 4/2013 | Nakamura et al. | ........... | 180/68.1 |
| 2006/0191500 A1 * | 8/2006 | Sugiyama et al. | ......... | 123/41.12 |
| 2008/0220710 A1 * | 9/2008 | Nonnenmacher et al. | ...... | 454/75 |
| 2010/0316501 A1 * | 12/2010 | Bain | ............................. | 416/246 |
| 2012/0097465 A1 * | 4/2012 | Leffert et al. | ................ | 180/68.1 |

* cited by examiner

*Primary Examiner* — Rita Leykin
(74) *Attorney, Agent, or Firm* — Muncy, Geissler, Olds & Lowe, P.C.

(57) ABSTRACT

The system has a driving circuit for the motor of the electric fan, coupled to the electrical system of a motor vehicle and having a plurality of controlled electronic switches, and an electronic control unit arranged to control the driving circuit in such a way as to cause the flow in the motor of a variable average current capable of producing a required speed of rotation, in accordance with a predetermined relationship or function. The control unit is designed to store a predetermined threshold of rotation speed, and to control the motor through the associated driving circuit in such a way that when the rotational speed of the motor exceeds the threshold the driving circuit causes electrical braking of the motor.

10 Claims, 4 Drawing Sheets

SYSTEM FOR CONTROLLING THE SPEED OF AN ELECTRIC FAN

CROSS REFERENCE TO RELATED APPLICATIONS

This non-provisional patent application claims priority under 35 U.S.C. §119(a) from Patent Application No. TO2010A001007 filed in Italy on Dec. 16, 2010, the disclosure of which is incorporated herein by reference.

FIELD OF THE INVENTION

This invention relates to a fan of a vehicle and in particular, to a system for controlling the speed of the fan.

BACKGROUND OF THE INVENTION

The present invention relates to a system for controlling the speed of an electric cooling fan, including an impeller driven by an electric DC motor and associated with one or more heat exchangers mounted in a motor vehicle, in such a way that the forward displacement of the motor vehicle is such as to cause a flow of air which impinges on the impeller of the electric fan, causing a rotation thereof in the same direction as the rotation caused by the associated electric motor.

More specifically, the invention relates to a control system of this kind, comprising: a driving circuit for the motor of the electric fan, coupled to the electrical system of the motor vehicle and comprising a plurality of controlled electronic switches, and an electronic control unit arranged to control the driving circuit so as to cause the flow in the motor of the electric fan of a variable average current capable of making the motor of the electric fan reach a required rotation speed in accordance with a predetermined relationship or function.

FIG. 1 of the attached drawings is a schematic representation of the architecture of a control system of this kind according to the prior art. Incidentally, a control system according to the present invention has essentially the same architecture.

In FIG. 1, EP indicates the whole of what is known as a heat exchanger "package", mounted in the front compartment under the bonnet of a motor vehicle, and associated with an electric fan indicated as a whole by EF. This electric fan comprises a bladed impeller BI, of a known type, rotated by an electric DC motor EM. This motor is, for example, a brushless motor, or a motor with brushes, and is driven by a circuit (or "driver") MDC which is connected to the electrical system of the motor vehicle which includes a battery B.

The driving circuit MDC is controlled by an electronic control unit ECU which can be, for example, the electronic control unit associated with the internal combustion engine of the motor vehicle. This unit receives numerous pieces of information from various sensor devices, indicated as a whole by S in FIG. 1.

The control unit ECU is designed to control the driving circuit MDC, according to a predetermined relationship or function, such as that illustrated in a qualitative manner in FIG. 2 by way of example, thus causing a variable average current to flow in the motor EM in such a way that the motor is made to reach the rotation speed n (the required speed).

In FIG. 2, the values of a control magnitude are shown on the horizontal axis, and the corresponding values of the required speed n of the motor EM are shown on the vertical axis. For example, the control magnitude or parameter may be the duty cycle of a fixed frequency square wave control signal.

As mentioned above, when the motor vehicle is displaced in a forward direction, a flow of air is naturally created, and passes through the exchanger package EP until it impinges on the impeller BI of the electric fan EF, causing it to rotate in the direction of the rotation imparted to the impeller by the associated electric motor EM. The action of this air current on the impeller BI is known as "wind-milling".

When the motor vehicle is moving forwards at a low speed, the action of the aforesaid air current causes a reduction of the torque that has to be developed by the motor EM in order to keep the impeller BI rotating at the desired speed. This results in a reduction of the average current and of the consumption of power from the battery B.

When the vehicle is moving forwards at higher speeds, the driving torque acting on the impeller BI of the electric fan as a result of wind-milling can increase to a point where the impeller BI starts to rotate at a higher speed than the requested speed n.

In the existing systems for controlling the rotation speed of an electric fan in such a condition, the impeller BI is allowed to rotate freely. Although this approach is simple, it has a number of drawbacks, including the acoustic noise and vibrations that are generated, and the fact that the heat exchanger package EP can be cooled more than necessary which may result in greater air pollution.

SUMMARY OF THE INVENTION

Hence there is a desire for a system for controlling the rotational speed of an electric fan which can overcome the drawbacks of the prior art systems in the wind-milling condition.

This is achieved in the present invention by using a control unit designed to store a rotational speed threshold and to control the motor of the electric fan, by means of the associated driving circuit, in such a way that, when the rotational speed of the motor exceeds the threshold, the driving circuit causes electrical braking of the motor.

Accordingly, in one aspect thereof, the present invention provides a system for controlling the speed of rotation of an electric fan including an impeller driven by an electric motor and associated with one or more heat exchangers mounted in a motor vehicle, in such a way that the forward displacement of the vehicle causes a flow of air which impinges on the impeller causing a rotation thereof in the same direction as the rotation caused by the electric motor, the system comprising: a driving circuit for the electric motor of the electric fan, coupled to the electrical system, including a battery of the motor vehicle and comprising a plurality of controlled electronic switches, and an electronic control unit arranged to control said driving circuit such as to cause the flow in the electric motor of a variable average current capable of making the electric motor reach a required speed of rotation, in accordance with a predetermined relationship or function, wherein the control unit is arranged to store a predetermined threshold of rotation speed, and to control the motor through the associated driving circuit in such a way that when the rotation speed of the electric motor exceeds said threshold the driving circuit causes electrical braking of the motor.

Preferably, the relationship or function associates values of the required speed of the electric motor, comprised between a minimum value and a maximum value, with corresponding values of a parameter upon which the speed of rotation of the motor depends, and wherein the speed threshold is a constant value, greater than or at least equal to the maximum value of the required rotation speed of the motor.

Preferably, the relationship or function associates values of the required rotational speed of the electric motor which increase, in a not necessarily constant manner, between a minimum value and a maximum value, with increasing values of a parameter upon which the average amplitude of the current in the electric motor depends, and wherein said rotational speed threshold has a value which increases, in a not necessarily constant manner, with the increase of the values of said parameter; for each value of the parameter, the value of the speed threshold being greater than or at least equal to the corresponding value of the required rotation speed of the electric motor.

Preferably, the speed threshold has a value which increases linearly from the zero value of the parameter and up to a predetermined maximum value.

Preferably, the control unit is adapted so as not to cause the electrical braking of the electric motor of the electric fan when the value of the parameter is greater than a predetermined value.

Preferably, the driving circuit is configured and drivable so as to cause the electrical braking of the electric motor in a regenerative manner, supplying a current to the aforesaid battery.

Preferably, the driving circuit comprises a half-bridge circuit, including a pair of MOSFET transistors.

Preferably, the driving circuit is configured and drivable so as to cause electrical braking of the electric motor with dissipation of the current developed in the braking by the electric motor.

Preferably, the driving circuit comprises a full-bridge circuit, or an inverter for a three-phase electric motor, including four or, respectively, six transistors, in particular MOSFET transistors.

Preferably, the driving circuit is configured and selectively drivable in a first or in a second manner, to cause electrical braking of the electric motor, selectively in a regenerative manner or in a dissipative manner.

Preferably, the braking current of the electric motor is controlled by means of a PWM signal applied to the gate of the electronic switches of the driving circuit.

BRIEF DESCRIPTION OF THE DRAWINGS

Preferred embodiments of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
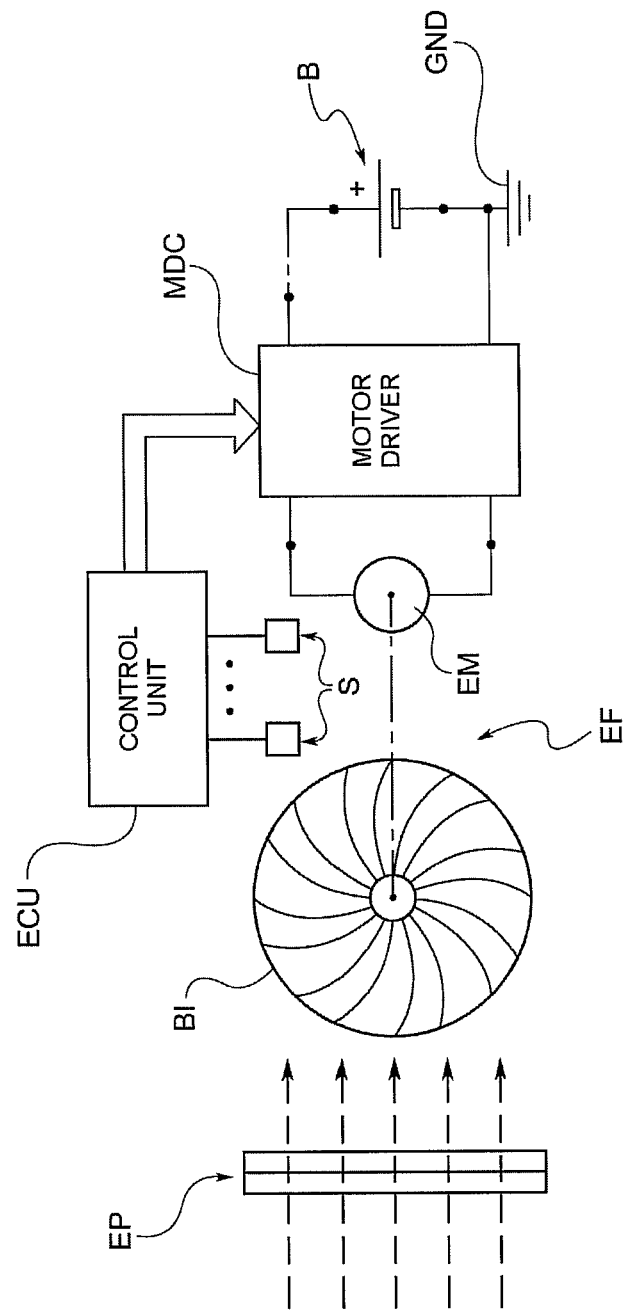
FIG. 1, is a schematic representation of the architecture of a system for controlling the rotation speed of an electric cooling fan for a motor vehicle.
Figure 3:
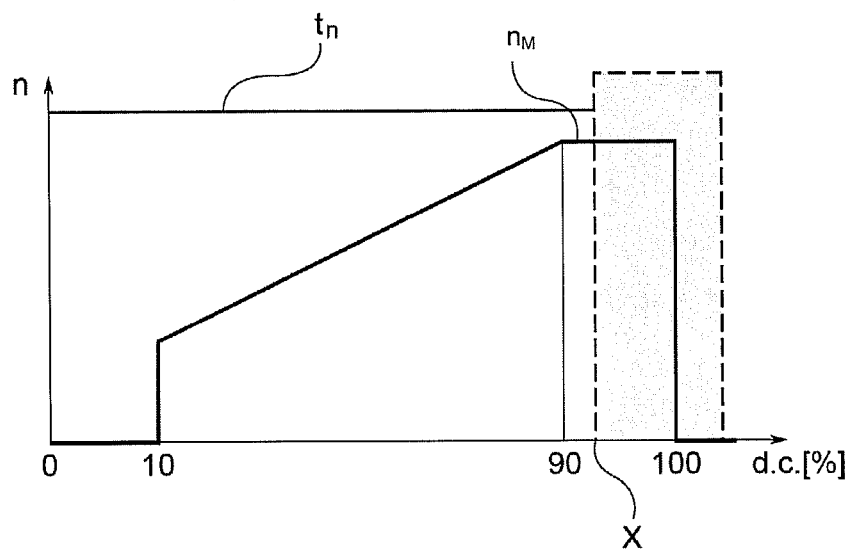
FIG. 3 is a graph similar to FIG. 2, provided for the purpose of explaining a possible operating mode of a control system according to the present invention.

With reference to FIGS. 1 and 3, in a first embodiment the control unit ECU of the system according to the invention is conveniently designed to store a rotational speed threshold and to control the motor EM of the electric fan EF, by means of the associated driving circuit MDC, in such a way that, when the actual rotational speed of the motor EM exceeds this threshold tn, the driving circuit MDC causes the electrical braking of this motor.

Figure 2:
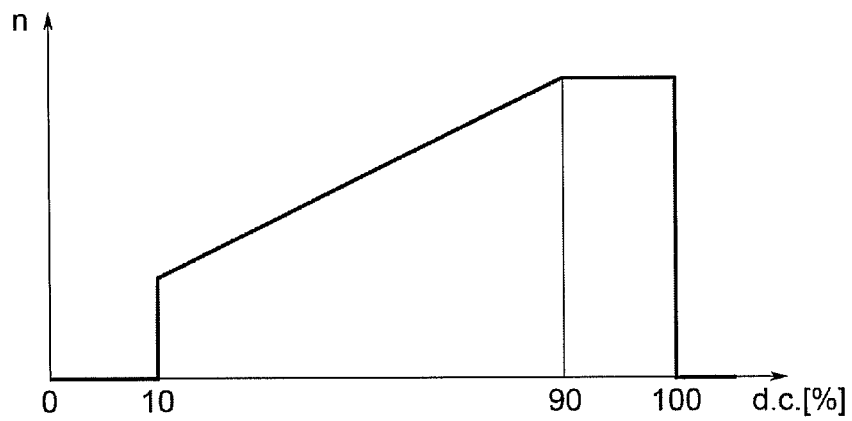
FIG. 2, is a graph showing a relation or function, of a known type, which correlates the values of a control parameter with the required speed n of the electric fan motor.

In the implementation to which the graph in FIG. 3 relates, the relationship or function linking the duty cycle (d.c.) shown on the horizontal axis with the required speed n of the motor EM is the same as that shown in the graph of FIG. 2, and the rotation speed threshold tn has a constant value, which is greater than the maximum value $n_M$ of the required rotation speed n of the motor.

In an embodiment which is not shown, the threshold $t_n$ can have a constant value equal to the maximum value $n_M$.

The control unit ECU can conveniently be designed so as not to cause the electrical braking of the motor EM of the electric fan EF when the value of the parameter on the horizontal axis of the graph of FIG. 3, for example the duty cycle defined above, is greater than a predetermined value X. For values of this parameter greater than X, the impeller BI is allowed to rotate freely, at speeds which may exceed the threshold $t_n$, to provide the maximum cooling effect.

Figure 4:
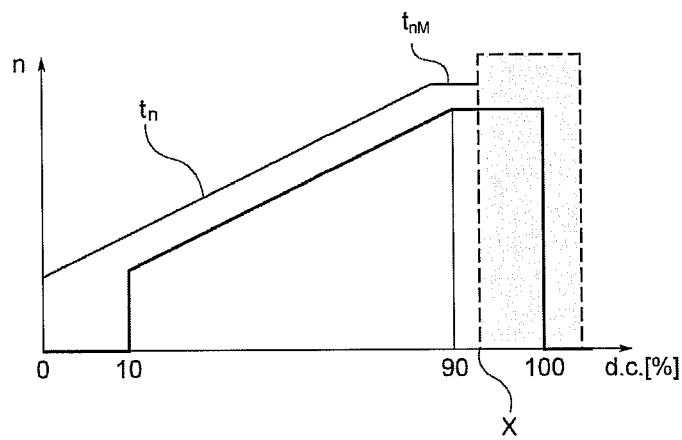
FIG. 4 is a graph similar to that of FIG. 3, illustrating another operating mode of a control system according to the present invention.

FIG. 4 shows a graph illustrating the same relationship or function as that of FIGS. 2 and 3 between the required speed n of the motor EM and the duty cycle defined above. This relationship or function associates values of the speed n which increase (not necessarily in a linear or constant manner) between a minimum value and a maximum value with increasing values of the duty cycle shown on the horizontal axis. In the embodiment to which the graph of FIG. 4 relates, the rotation speed threshold tn does not have a constant value, but has a value which increases with an increase in the values of the duty cycle shown on the horizontal axis. In particular, for each value of this duty cycle, the associated value of the speed threshold tn is equal to or greater than the corresponding value of the speed n. In the specific non-limiting example shown in FIG. 4, the speed threshold $t_n$ increases linearly from a minimum value corresponding to the zero value of the duty cycle on the horizontal axis to a maximum value $t_{nM}$.

Alternatively, the variation of the speed threshold $t_n$ can be identical to that of the stored relationship or function which correlates the required speed n of the motor EM with the duty cycle (d.c.) shown on the horizontal axis of FIG. 4.

If the speed threshold $t_n$ does not have a constant value, as shown in the graph of FIG. 4, it is again possible to design the control unit ECU so as not to cause the electrical braking of the motor EM when the duty cycle of FIG. 4 is greater than a predetermined value X.

In general, in order to cause the braking of an electric motor, it is necessary to make the current in its windings flow in a direction opposite to the normal direction.

Figure 5:
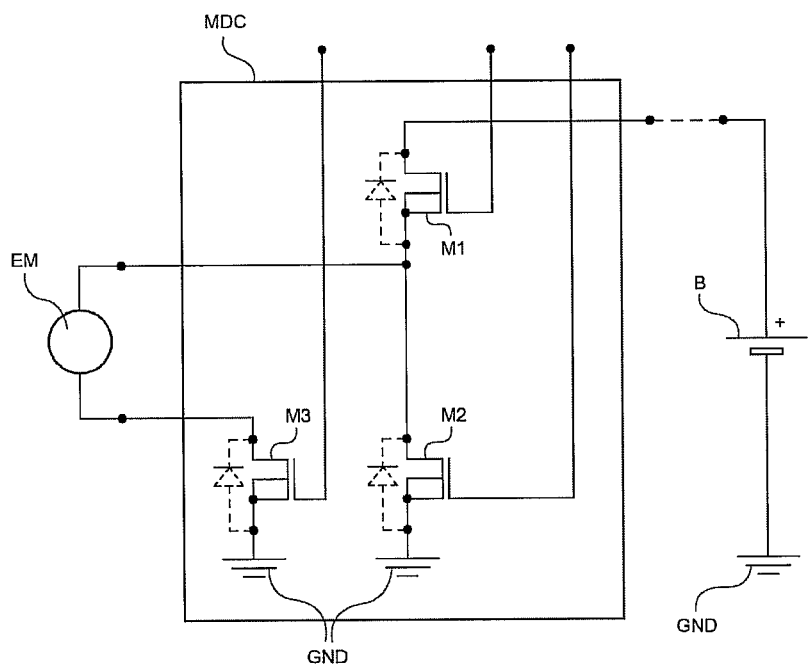
FIG. 5 is a circuit diagram of an embodiment of a driving circuit which can be used in a control system according to the present invention.

FIG. 5 shows a driving circuit MDC of the bridge type for controlling the motor EM of the electric fan where this motor is of the brushless type.

The circuit MDC of FIG. 5 comprises three MOSFET transistors, indicated by M1, M2 and M3, each having a respective intrinsic diode (or "parasitic" or substrate diode).

The transistors M1 and M2 are interconnected, between the terminals of the battery B. The motor EM is connected between the point of interconnection of the transistors M1 and M2 and the ground GND, through the transistor M3. The gates of the transistors M1, M2 and M3 are connected to and controlled by the unit ECU.

In operation, the transistors M1 and M2 are driven by respective PWM gate signals, the signal applied to the gate of M2 being phase-shifted through 180 degrees electrical with respect to the signal applied to the gate of M1. Conveniently, a "dead zone" is provided between the two driving signals of M1 and M2 in order to prevent their cross conduction. The transistor M3 is kept constantly conducting.

In normal operation, a current flows from the positive pole of the battery B through the transistor M1 (when it is "closed"), the motor EM and the transistor M3.

The motor EM rotates and generates a torque dependent on the average current flowing through it, which depends on the driving duty cycle of the transistor M1.

Using the driving circuit MDC of FIG. 5, it is possible to provide regenerative braking of the motor EM, by means of which the current generated by the back electromotive force (back emf) developed in the motor EM is made to flow back to the battery B. Thus it is possible to achieve a convenient degree of energy recovery by applying to the motor an average voltage which depends on the value of the PWM signal applied to the gate of M1, which is less than the back electromotive force BEMF.

The maximum current in the motor, and consequently the braking torque, can be limited by calculating the minimum value of the PWM signal applied to the gate of M1. Thus the maximum recovered power can be defined, and uncontrolled operating conditions are avoided. Clearly, if the applied torque is insufficient, the fan will rotate at a speed greater than that specified as the limit speed.

Figure 6:
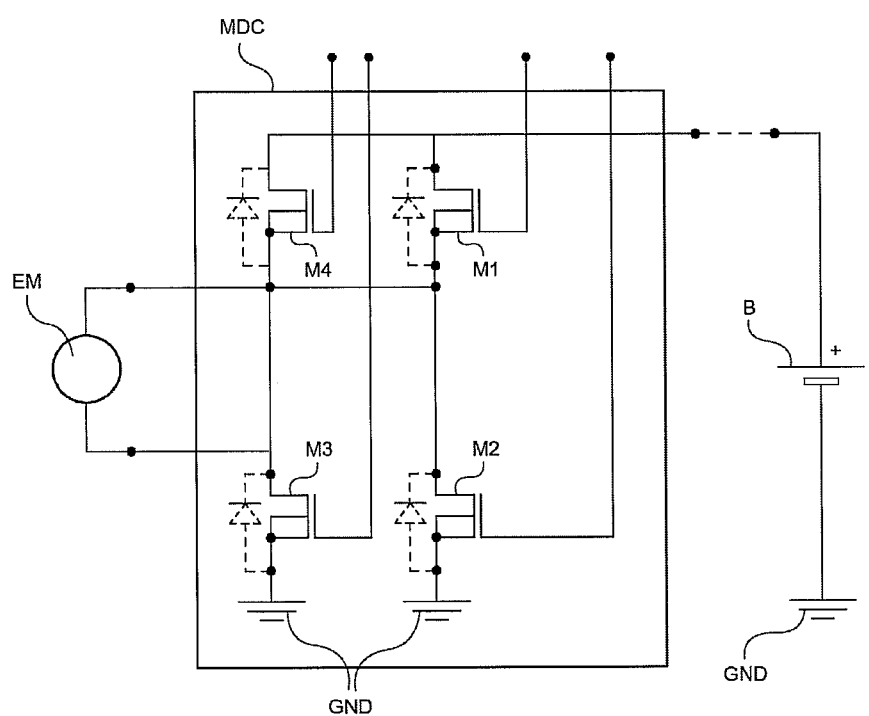
FIG. 6 is a circuit diagram showing another embodiment of a driving circuit for a control system according to the present invention.

FIG. 6 is the schematic diagram of a driving circuit MDC of the type known as a full bridge circuit. The circuit of FIG. 6 differs from that of FIG. 5 by the presence of a further transistor M4, connected between the transistor M3 and the positive pole of the battery B.

With the circuit according to FIG. 6, the normal rotation of the motor EM is controlled by driving the transistor M1, and also M2 in a complementary manner, with a phase shift of 180 degrees electrical with respect to M1, while the transistor M3 is on and M4 is off.

The electrical braking of the motor EM in the circuit shown in FIG. 6 is carried out by driving the transistor M3, and also M4 in a complementary manner, with a phase shift of 180 degrees electrical with respect to M3, while the transistor M2 is on and M1 is off.

The electrical braking produced in this way is dissipative, in other words non-regenerative.

The above description of FIG. 6 is evidently also applicable, mutatis mutandis, to an inverter for a three-phase electric motor comprising six electronic switches instead of four.

In some conditions, the energy developed in electrical braking may not be recoverable, and therefore it may be convenient to provide a driving circuit which can provide either regenerative or dissipative electrical braking in a selective manner, by an appropriate setting of the input control signal. The circuit shown in FIG. 6 offers this possibility.

The above description and the attached drawings illustrate control circuits which can be used for driving brushless electric motors. With minor modifications, which will be evident to those skilled in the art, it is possible to provide corresponding circuits which can be used to drive electric DC motors of the type using brushes.

In the description and claims of the present application, each of the verbs "comprise", "include", "contain" and "have", and variations thereof, are used in an inclusive sense, to specify the presence of the stated item but not to exclude the presence of additional items.

Naturally, the principle of the invention remaining the same, the forms of embodiment and the details of construction may be varied widely with respect to those described and illustrated, which have been given purely by way of non-limiting example, without thereby departing from the scope of the invention as defined by the attached claims.

The invention claimed is:

1. A system for controlling the speed of rotation of an electric fan including an impeller driven by an electric motor and associated with one or more heat exchangers, mounted in a motor vehicle in such a way that the forward displacement of the vehicle causes a flow of air which impinges on the impeller causing a rotation thereof in the same direction as the rotation caused by the electric motor, the system comprising:
a driving circuit for the electric motor of the electric fan, coupled to an electrical system including a battery of the motor vehicle and comprising a plurality of controlled electronic switches, and
an electronic control unit arranged to control said driving circuit such as to cause the flow in the electric motor of a variable average current capable of making the electric motor reach a required speed of rotation, in accordance with a predetermined relationship or function, wherein the control unit is arranged to store a predetermined value of duty cycle and a predetermined threshold of rotation speed, and to control the motor through the associated driving circuit in such a way that when the duty cycle is not greater than the predetermined value and the rotation speed of the powered electric motor exceeds said threshold the driving circuit causes electrical braking of the motor and when the value of the duty cycle is greater than the predetermined value and the rotation speed of the powered electric motor exceeds said threshold the driving circuit does not cause the electrical braking of the powered electric motor of the electric fan.

2. The system of claim 1, wherein the relationship or function associates values of the required speed of the electric motor, comprised between a minimum value and a maximum value, with corresponding values of a parameter upon which the speed of rotation of the motor depends, and wherein the speed threshold is a constant value, greater than or at least equal to the maximum value of the required rotation speed of the motor.

3. The system of claim 1, wherein the relationship or function associates values of the required rotational speed of the electric motor which increase between a minimum value and a maximum value, with increasing values of a parameter upon which the average amplitude of the current in the electric motor depends, and wherein said rotational speed threshold has a value which increases with the increase of the values of said parameter; for each value of the parameter, the value of the speed threshold being greater than or at least equal to the corresponding value of the required rotation speed of the electric motor.

4. The system of claim 3, wherein said speed threshold has a value which increases linearly from the zero value of the parameter and up to a predetermined maximum value.

5. The system of claim 1, wherein the driving circuit is configured and drivable so as to cause the electrical braking of the electric motor in a regenerative manner, supplying a current to the aforesaid battery.

6. The system of claim 5, wherein the driving circuit comprises a half-bridge circuit, including a pair of MOSFET transistors.

7. The system of claim 1, wherein the driving circuit is configured and drivable so as to cause electrical braking of the electric motor with dissipation of the current developed in the braking by the electric motor.

8. The system of claim 7, wherein the driving circuit comprises a full-bridge circuit, or an inverter for a three-phase electric motor, including four or, respectively, six transistors, in particular MOSFET transistors.

9. The system of claim 1, wherein the driving circuit is configured and selectively drivable in a first or in a second manner, to cause electrical braking of the electric motor, selectively in a regenerative manner or in a dissipative manner.

10. The system of claim 9, wherein the braking current of the electric motor is controlled by means of a PWM signal applied to the gate of the electronic switches of the driving circuit.

* * * * *